United States Patent [19]
Onken

[11] Patent Number: 6,157,776
[45] Date of Patent: Dec. 5, 2000

[54] HEATED STORAGE TANK FOR GREASE RECYCLING

[76] Inventor: Donald R. Onken, P.O. Box 72, Easton, Ill. 62633

[21] Appl. No.: 08/969,465

[22] Filed: Nov. 13, 1997

[51] Int. Cl.[7] .................................. F24H 1/18; H05B 3/06

[52] U.S. Cl. ........................... 392/441; 392/497; 219/523

[58] Field of Search ..................................... 392/441, 497, 392/501, 456; 219/520, 523, 530

[56] References Cited

U.S. PATENT DOCUMENTS

| | | | |
|---|---|---|---|
| 1,705,417 | 3/1929 | Rogers | 392/449 |
| 2,354,061 | 7/1944 | Richardson | 219/205 |
| 5,609,193 | 3/1997 | Steckler | 141/231 |

*Primary Examiner*—Teresa Walberg
*Assistant Examiner*—Thor Campbell
*Attorney, Agent, or Firm*—Ronald E. Greigg; Edwin E. Greigg

[57] ABSTRACT

A system for storing grease in a storage tank for removal of spent grease from the storage tank. The storage tank includes a heating device which comprises a L-shaped tubular heating device having a heating element inserted into it, a non-flammable and preferably non-toxic heat transfer fluid supplied within the L-shaped heating tube of the device, and a pop-off or check valve supplied on the extremity of one leg of the L-shaped heat tube to relieve excess pressure should the heating element cause the heat transfer fluid to boil due to some malfunction. The heating element is desirably disposed in one leg of the L-shaped tube, preferably in the shorter of the two legs forming the L-shape of the heat tube, and extends into one of the legs at least a portion of its length. The heating device is preferably mounted in the tank with its longer leg extending vertically through a large extent of the height of the tank and the shorter leg is mounted into the side wall of the tank to allow for servicing the heating element. A mixture of water and antifreeze constitutes the heat transfer fluid. The antifreeze substance used is a nonpoisonous, non-polluting type. A motor and pump are provided for pumping grease into the storage tank from a grease container. A light indicator indicates a full extent of the grease within the storage tank and a switch control inactivates the motor when the tank is nearly full. Optionally a thermostat could be used as a back-up temperature control device.

11 Claims, 3 Drawing Sheets

HEATED STORAGE TANK FOR GREASE RECYCLING

FIELD OF THE INVENTION

The invention comprises improvements in storage tank systems for spent cooking oils produced in a restaurant kitchen.

BACKGROUND OF THE INVENTION

The growth of the food service industry in the United States has produced a need for a new, more convenient system of recycling used cooking oils produced in the frying process. Up until the mid-1980's standard recycling equipment was the 55 gallon barrel. This equipment received a slight upgrade in the 1970's by the provision of a cosmetic, metal cabinet enclosure to encase the barrels.

In 1983 Don Onken of Onken Enterprises introduced the bulk tank storage method of collection to the rendering industry. This bulk collection paradigm was quickly adopted by the rendering industry because it essentially perfected the collection method from corral to plant for the benefit of the renderer. This collection method tripled route capacity and reduced processing costs by bulking the material collected in the truck. Today, you will find these bulk containers behind most restaurants in the United States and Canada. They have become as ubiquitous as the trash dumpster.

Now, in the second half of the 1990's, a new paradigm is being introduced to the food service industry. This paradigm is generically known as an AUTOMATED GREASE HANDLING SYSTEM. Its design is for the benefit of the food service operator. It automates a number of the steps involved in the recycling of fats from the fryer to the recycling plant. It is a major paradigm shift for the industry. This system can be retrofitted into most existing restaurant locations or installed as new equipment in a new restaurant.

In essence, rather than store grease in a dumpster-like container outside the restaurant, the grease is now placed in a heatable tank inside the restaurant kitchen which can be evacuated to a truck outside by through-the-exterior-wall connections. It is still necessary to maintain the grease at a warm temperature so that it will flow through the evacuation plumbing to the collection truck. It is also necessary to have a reliable means for monitoring the remaining capacity of the storage tank to avoid over-filling it.

PRIOR ART

Prior to the invention of the submersible heat unit, each tank had a strip heat air pipe system. This system is used to heat the fat so that it can be pumped out of the tank. The strip heat air pipe system consisted of a 500-watt strip heater placed in a 3" pipe mounted 10" off the bottom of the tank. The strip heat air pipe system was supported by a flat system, electrical relay switch, thermostat, and upper limit switch.

The strip heater heated the air in the pipe which in turn heated the pipe which transferred the heat into the fat inside the tank covering the pipe. In order to control the heat, a thermostat set at 110° was mounted to the exterior tank wall directly above the heat transfer pipe. Additionally, a float switch is needed so that the heat can be activated only when the fat level exceeded the height of the pipe.

This system has two weaknesses:
1. The float switch fouls because the added hot fat cools before the float rises to activate the heater. This results in a tank of cool grease which cannot be evacuated.
2. The strip heater cannot be activated until the level of fat rises above the heater pipe. In an empty tank the heater pipe generates an uncontrolled degree of heat before the thermostat shuts it off because the side wall does not heat up with no fat between it and the heater pipe. This uncontrolled temperature rise can create a dangerous condition which precludes a constant heat state.

OBJECTS OF THE INVENTION

It is a principal object of the invention to provide a heating system for a grease storage tank that eliminates the dangers associated with strip heaters, i.e., of possible explosions due to grease being poured into a tank having a heater which is in an overheated state when there is little grease in the tank to absorb the excess heat.

It is another object to provide a heating means that provides a uniform heat through the tank so as to maintain all of the grease in a fluid state.

It is yet another object to provide a heating system for which maintenance is effected simply and inexpensively, since there is only a single part to replace if it wears out, namely, the heating coil element.

It is still another object of the invention to provide a storage tank which is less expensive to build by eliminating some of the complexity and some of the parts contained in the current tank system.

SUMMARY OF THE INVENTION

What is needed is a device to provide constant, controlled heat (approximately 110°–120°) throughout the tank. The submersible heat unit of this invention does exactly that. The voltage of the submersible heater is sized so that it can heat an internal fluid (a glycol-water mix) held in the unit to the optimum temperature so that the fat is held at 110°–120°. The submersible heater unit eliminates the float system, the thermostat, the upper limit control switch, relay, and wiring. It achieves the desired heat transfer while simplifying the mechanism, reducing costs, controlling the heat consistently, and providing a margin of safety. The design of the submersible heat unit allows for accessibility which eases maintenance. The only part that will need replacement over time is the heat element.

There is also the need for a reliable means of cutting off the pumping of used cooking oil into the tank when the tank becomes full. The invention includes a magnetic float switch means constructed to extend down into the tank. The magnetic float switch includes electrical switching means that opens when the tank is full which activates a relay to shut off the pump that transfers oil into the tank to avoid over-filling the tank. Also, the magnetic float switch means includes a second switch means that closes when the tank is full in order to activate a light which indicates a full tank.

The invention will be better understood and further objects and advantages thereof will become more apparent from the ensuing detailed description of preferred embodiments taken in conjunction with the drawings.

Figure 1:
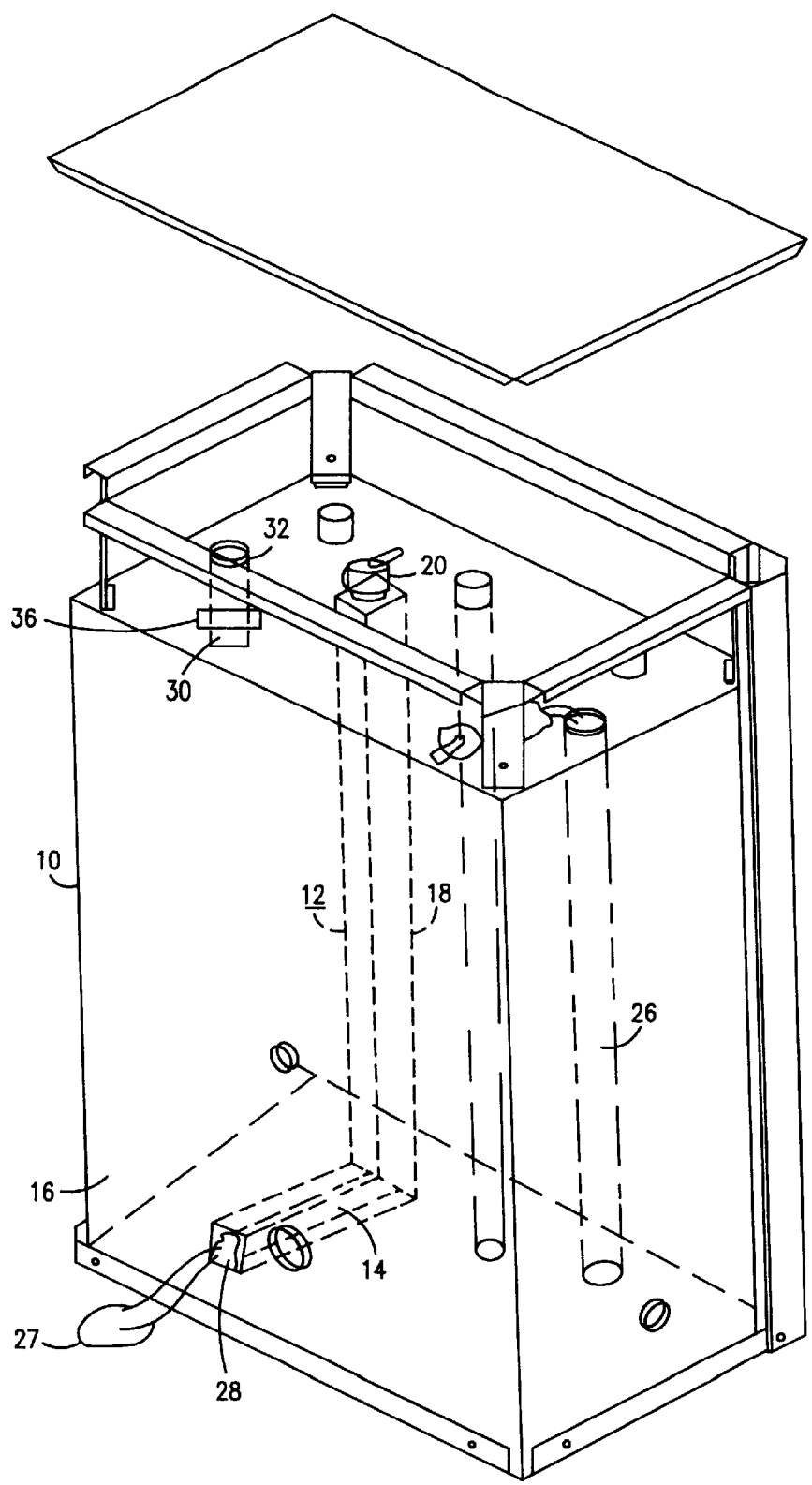
FIG. 1 is a perspective view of a tank following the invention to illustrate the position of the heat unit and the oil level sensing unit.

Now referring to the drawings, in which like reference characters indicate like parts throughout the drawings, there is shown in FIG. 1 a grease storage tank 10 which is suitable for storing collected spent grease within a storage area of the restaurant. The grease is dumped from the cooker via a valve, not shown, into a grease caddy, not shown, such as that described in patent application Ser. No. 08/922,332, filed Sep. 3, 1997, which is incorporated herein by reference. The grease caddy is placed under the frying vat or cooker so that the vat grease can be drained from the frying vat to the tank through an inlet and strainer in the top of the grease caddy.

Figure 3:
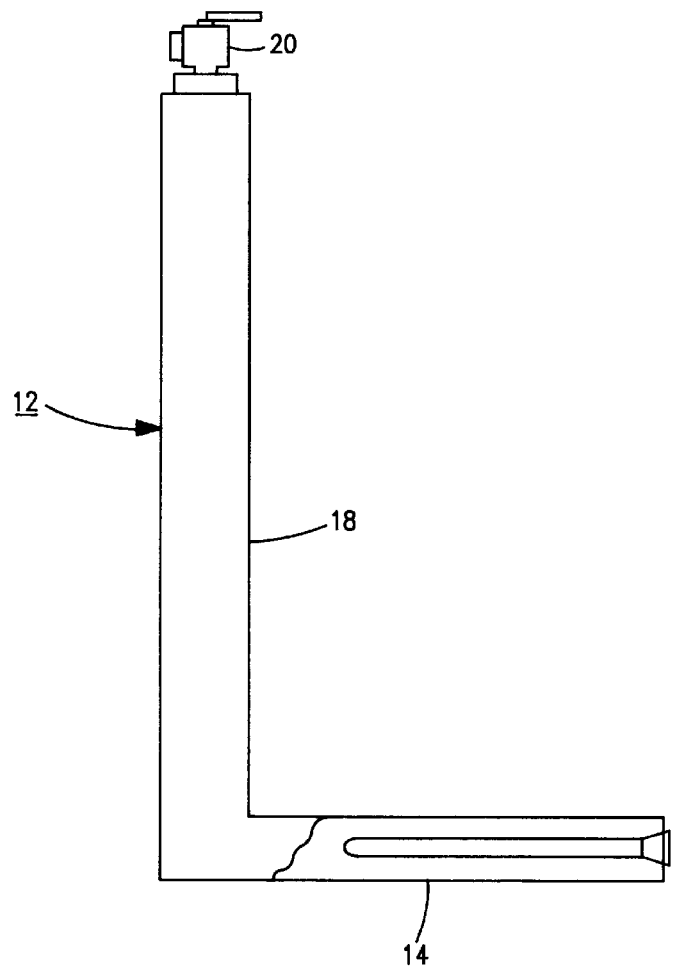
FIG. 3 is a side view of the heater tube shown prior to assembly into the tank.

Referring now to FIG. 3, the storage tank 10 is shown to include a heater 12. The heater includes a horizontal tube 14 and a vertical tube 18, the tubes arranged in an L-shaped configuration so as to communicate. The heater element 15 is inserted into the horizontal tube at one end as shown. The heater is filled with a water-antifreeze solution mixture acting as a heat transfer fluid. Applicant has determined that the optimum heat transfer fluid is a 50—50 mix of water and a nontoxic antifreeze which is sold under the trademark SIERRA©. The heater 12 is secured within the storage tank so that the heater element portion 14 extends from a side 16 of the tank to a point near the opposite side 17 of the tank. The upstanding leg 18 of the L-shaped heater element projects through the top of the tank and is provided with a pressure control valve 20. The heater can heat the collected grease to a temperature of about 110°–120° which maintains the grease in a fluid state so that it can be pumped from the storage tank to a transport truck outside of the building. It is well known that grease or fats usually solidify at room temperature and are difficult to pump at room temperature. Therefore, the heater heats and maintains the fat in a fluid state so that it can be easily pumped. The L-shaped heater of this invention has been separately more fully disclosed in application Ser. No. 08/801,470 filed Feb. 18, 1997, which is incorporated herein by reference.

Figure 2:
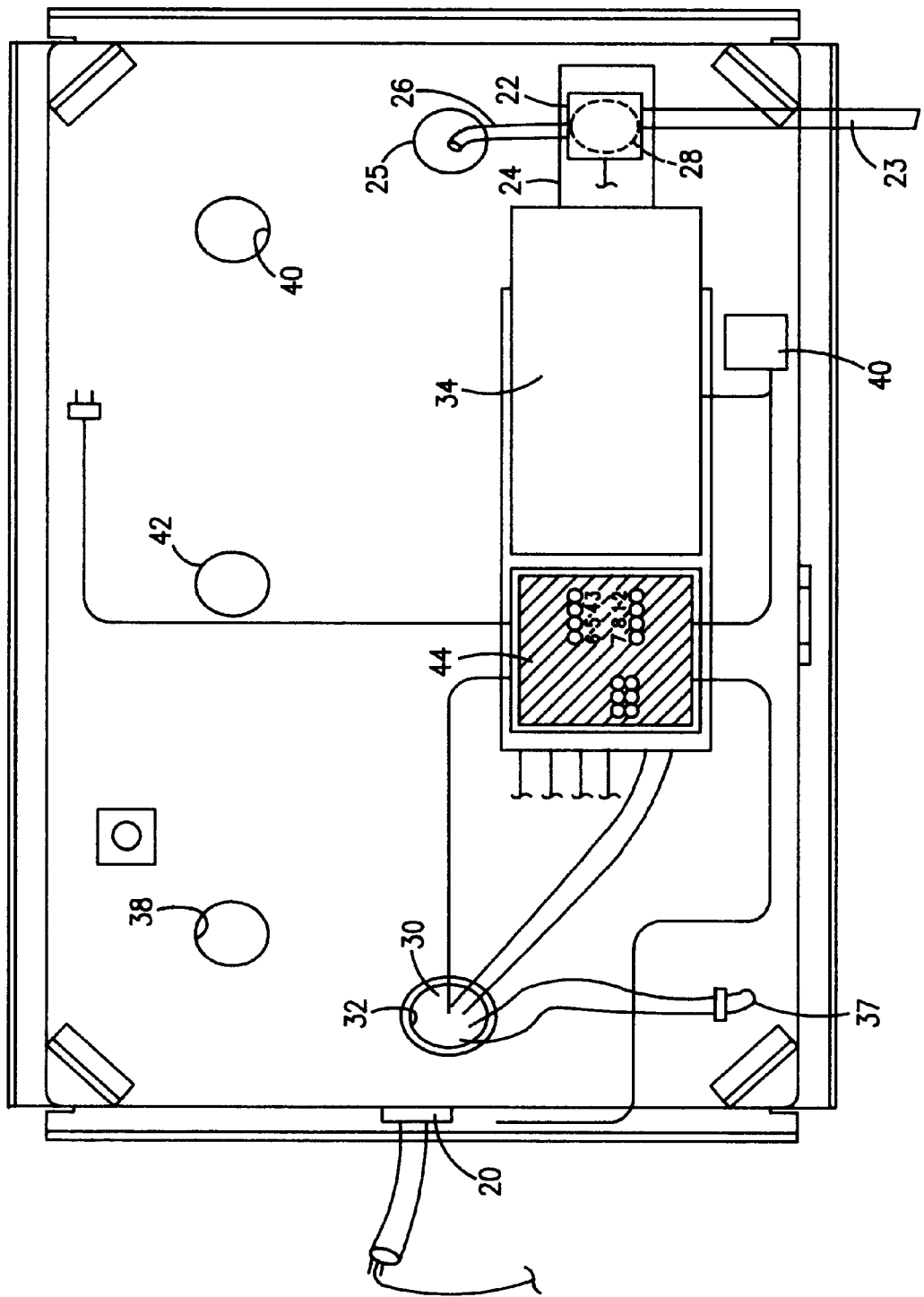
FIG. 2 is a top view of the tank showing the electrical elements, the pump and motor, and the location wherein the fluid grease level sensing unit is inserted into the tank.
Figure 4:
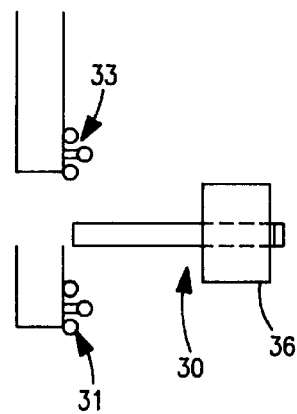
FIG. 4 is a schematic view of the magnetic float switch means illustrating the pump shut-off switch and the light activation switch.

In order to pump the grease from the caddy to the storage tank, a motor 22 and pump 24 are provided which are secured on the upper end of the tank, see FIG. 2. A tube extension 26 extends from the pump to an inlet 25 to the tank so that grease pumped from the caddy via inlet tube 23 may be deposited into the tank. In one possible embodiment of the invention, applicant would use thermostatic means to control the temperature of the heated grease as a safety measure. In that case a thermostat 28 is connected to the heater element to prevent overheating of the grease. Electrical lines 27 are shown connected to the thermostat 28. A hose is attached between the caddy and the pump inlet 23 in order to drain the caddy. A full tank measuring device 30 (see FIG. 1) for determining the height of the grease in the container extends into the tank via an aperture 32 and is secured at its upper end to the top of the tank. The device 30 is a well known magnetic float switch which is shown schematically in FIG. 4. The float switch has a normally closed switch 31 for operation of the motor which is shown in the open position to inactivate the motor when the grease has reached a full height and a normally open switch 33 which is closed when the grease is at a full height in order to activate a light that indicates the tank is full. Electrical lines extend from a control box 34 and are connected with the switches 31 and 33 at the upper end of the magnetic float switch 30.

A control element 26, such as a cylindrical float is positioned on a pipe guide which floats as the heated grease reaches near the top of the tank in order to control the switches 31 and 33. The float 36 moves upwardly in response to the oil level contained to the switch element which then closes the switch to activate the light and opens the switch 31 to stop the motor. When the float 36 indicates a full tank, it activates control switch 31 to shut off the motor so that the motor does not pump any more grease into the storage tank. The float also closes the switch 33 in order to activate the lamp, so that one is alerted by the lamp that the storage tank is full and should be emptied. The magnetic float switch 30 inactivates the motor so that no more grease is added to the storage tank. The electrical wires to the magnetic float switch 30 are shown extending from the opening 32. The wires are connected with the control box 34. Further, the electrical wire to the thermostat-heater is also connected with the control box. The storage tank is provided with vent holes 38, 40 (see FIG. 2) which vent the tank to the atmosphere. An outlet 42 is provided for pumping the grease out of the storage tank into a transport truck which collects the grease from the storage tank. A motor-pump combination on the truck pumps the grease from the storage tank to the transport truck. The heater is activated at all times when used for fat storage in order to help maintain the fat in a fluid state.

A timer 44 is provided to control the motor-pump for operation for a certain time period, say, 5 minutes. The storage tank will not overfill because the magnetic float switch 30 will prevent the tank from overflowing by breaking the electrical circuit to the motor on the storage tank when the tank is full.

In carrying out the teaching of this invention, the motor-pump on the storage tank is used to pump the grease from a grease caddy, which has been wheeled into a position alongside the storage tank from a normal position below the cooker and into which the grease is drained from the cooker to the grease caddy.

In operation of the storage tank system, the grease is drained from a cooker into the grease caddy and then the grease caddy is rolled to a position near the storage tank and the grease is pumped from the grease caddy to the storage tank via the pump on the storage tank. Once the storage tank is filled with spent grease and oil, the grease is pumped from the storage tank to a truck on the outside of the building and is then hauled away for disposal.

By having a storage tank inside the building, no unsightly tank or dumpster-like receptacle is needed outside of the building. Further with the storage container inside the building, it will not require as much electrical energy to heat the stored grease to about 110° so that the grease can be kept fluid to allow it to be pumped from the storage tank to the transport truck. With the storage tank within the building, personnel need not go outside to put the used grease into a tank outside of the building.

The foregoing relates to preferred exemplary embodiments of the invention, it being understood that other variants and embodiments thereof are possible within the spirit and scope of the invention, the latter being defined by the appended claims.

I claim:

1. A system for storing cooking grease used in a cooker, comprising, a grease storage tank, said grease storage tank includes a motor-pump for pumping grease into the storage tank from a grease container, a grease heater means within said grease storage tank operative via a heat transfer fluid means for heating and maintaining grease within said storage tank to a molten state, a full tank determining means which inactivates said motor-pump when the grease reaches a certain height and which activates an alert means at the same time to indicate a substantially full storage tank, and vent means for venting gases from said storage tank.

2. A system as set forth in claim 1, in which a thermostat is provided for controlling said heater means to limit a temperature of the grease.

3. A system as set forth in claim 1, in which said heater means heats said grease in said storage tank to a temperature of about 110°–120° F. which maintains the grease in a fluid state.

4. A system as set forth in claim 2, in which said heater means includes a L-shaped housing with first and second legs within said storage tank with a heater element extending along one leg of the L-shaped housing, said first and second legs of said L-shaped housing are filled with a heat transfer fluid therein which is heated by said heater element, and said L-shaped housing includes a pressure valve which is opened at a desired pressure.

5. A system as set forth in claim 3, in which, said heater means includes a L-shaped housing with a heater element extending along one leg of the L-shaped housing, said L-shaped housing is filled with a heat transfer fluid therein which is heated by said heater element, and said L-shaped housing includes a high pressure valve which is opened at a desired high pressure.

6. A system as set forth in claim 3, in which said heat transfer fluid comprises a mixture of antifreeze and water in approximately 50—50 proportions.

7. A system as set forth in claim 4, in which said heat transfer fluid comprises a mixture of antifreeze and water in approximately 50—50 proportions.

8. A system as set forth in claim 4, in which said L-shaped housing is mounted within said tank with a longer leg thereof extending upwardly from near a bottom end within said tank, said L-shaped housing includes a horizontal shorter leg which extends horizontally near said bottom end of said tank, an outer end of said shorter leg terminating at a side wall of said tank, and said heater means is mounted through said side wall of said tank into said shorter leg, whereby service may be performed easily on said heater means.

9. A system as set forth in claim 5, in which said L-shaped housing is mounted within said tank with a longer leg thereof extending upwardly from near a bottom end within said tank, said L-shaped housing includes a horizontal shorter leg which extends horizontally near said bottom end of said tank, an outer end of said shorter leg terminating at a side wall of said tank, and said heater means is mounted through said side wall of said tank into said shorter leg, whereby service may be performed easily on said heater means.

10. A system as set forth in claim 8, in which said heat transfer fluid comprises a mixture of antifreeze and water in approximately 50—50 proportions.

11. A system as set forth in claim 9, in which said heat transfer fluid comprises a mixture of antifreeze and water in approximately 50—50 proportions.

\* \* \* \* \*